Figure 1:
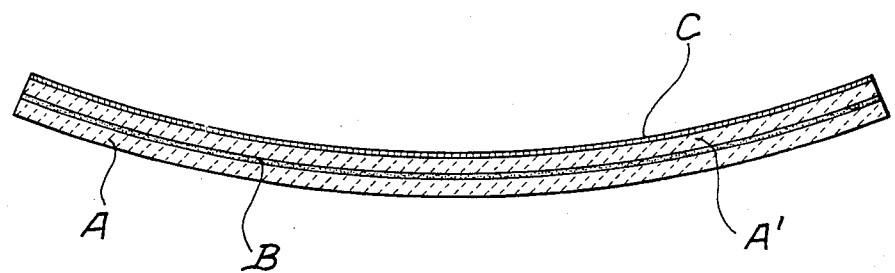

United States Patent [19]

Sebastiano

[11] Patent Number: 4,541,881
[45] Date of Patent: Sep. 17, 1985

[54] PROCESS FOR MANUFACTURING A MOTOR VEHICLE WINDSHIELD

[75] Inventor: Francesco Sebastiano, Termoli, Italy

[73] Assignee: Societa' Italiana Vetro - SIV - S.p.A., Vasto, Italy

[21] Appl. No.: 577,785

[22] Filed: Feb. 7, 1984

[30] Foreign Application Priority Data

Feb. 25, 1983 [IT] Italy ................. 19779 A/83

[51] Int. Cl.⁴ ............................................. B32B 17/00
[52] U.S. Cl. .................................. 156/99; 156/275.5; 156/280; 156/281; 204/159.15; 204/159.19; 296/84 R; 427/54.1; 427/55; 427/299; 428/425.6
[58] Field of Search ........ 156/99, 275.5, 280, 156/281; 428/425.6; 427/54.1, 55, 299; 296/84 R; 204/159.19, 159.15

[56] References Cited

U.S. PATENT DOCUMENTS

| | | | |
|---|---|---|---|
| 3,700,643 | 10/1972 | Smith et al. | 204/159.19 |
| 4,232,080 | 11/1980 | Orain et al. | 156/99 |
| 4,339,474 | 7/1982 | Kishisa et al. | 427/54.1 |

Primary Examiner—John J. Gallagher
Attorney, Agent, or Firm—Wenderoth, Lind & Ponack

[57] ABSTRACT

Process for manufacturing a safety motor vehicle windshield, more especially as regards lower formation of glass fragments in the event of impact or fracture of said windshield.

The process consists in coating the inside surface of said windshield with a liquid composition, which, after curing with ultraviolet and infrared rays, from a high strength, hard and flexible film.

The coating is prepared so that, during the curing process, a polyurethane of aliphatic polycaprolactone is formed as an interpenetrating network system, with a partially crosslinked vinylacrylic copolymer, the whole being formed in the presence of a controlled quantity of a polyester urethane acrylate prepolymer.

3 Claims, 3 Drawing Figures

PROCESS FOR MANUFACTURING A MOTOR VEHICLE WINDSHIELD

The invention relates to a process for manufacturing a motor vehicle windshield in which a windshield of standard laminated glass is coated on the inside surface with a new colorless transparent liquid composition capable of furnishing a polyurethane, with said polyurethane being subsequently cured by radiation to form a windshield and whereby when said windshield is fractured by impact, it does not produce any, or it produces greatly reduced, glass fragments able to cause injury to the vehicle's occupants.

Two types of windshields are used by the automobile industry, these being generally described as laminated or toughened glass products.

In the laminated types a highly thermoplastic flexible plastic sheet, usually of plasticized polyvinyl butyral, or less frequently of polyurethane, is laminated between two sheets of glass bonded together under heat and pressure.

In toughened glass a single glass pane is submitted to a stricly controlled heat treatment cycle or alternatively to a chemical surface treatment followed by controlled heat treatment.

The aim of these operations is to reduce risk of injury to the vehicle's occupants in the event of accidental breakage of the windshield.

In laminated glass windshields, the broken glass fragments are held together thanks to the flexibility of the intermediate layer as well as its adhesiveness to the glass on account of the high tensile strength and good elongation properties of said intermediate layer.

Resistance to penetration of objects in the windshield, such as stones and the like knocking against the windshield, is good.

However, when this type of windshield is broken, a certain quantity of small glass fragments similar to needles, is always formed and these glass fragments can fly from the windshield at high speed with risk of serious injury to the eyes and unprotected parts of the skin of the vehicle's occupants.

These types of injuries are generally referred to as lacerated wounds.

In toughened glass windshields, the behavior upon impact damage is completely different: the windshield fractures over its entire surface into small regularly sized pieces which are entirely free from sharp cutting edges and do not consist of needle-like particles ready to fly off. However, since the entire windshield fractures, it has low resistance to penetration by flying objects. Therefore there is serious risk of injury to the vehicle's occupants from this source.

The laminated glass windshield is normally considered to be superior to the toughened glass windshield, therefore it can be well understood that a process capable of eliminating the risk of forming lacerating type flying particles, is able to contribute to improved safety in road vehicles.

A standard laminated glass windshield consists of two bonded glass sheets, each about 2.5 mm thick, and a plasticized polymeric plastic intermediate layer about 0.75 mm thick. The entire structure being assembled together by a process well known to persons skilled in the art.

Attempts have been made the reduce to seriousness of the lacerated types wounds adopting various methods; thus U.S. Pat. Nos. 3,881,043, 3,931,113 and 4,041,208 granted to P.P.G. describe various polyurethane compounds as intermediate layers with better adhesiveness to the glass than that of polyvinyl butyral, e.g. a preformed polyurethane sheet obtained through the reaction of:

(a) a hydroxyterminated polyester of caprolactone, polybutylene adipate, polybutylene azelate or mixtures, (b) a diol with molecular weight less than 250, preferably 1,4 butane diol and (c) a cycloaliphatic di-isocyanate, is laminated between the two glass sheets.

However it can be shown that when a laminated glass windshield breaks, most of the lacerating fragments are formed by the glass surface not in contact with the intermediate layer; hence none of the processes designed to improve the intermediate layer succeeds in solving the problem of lacerating fragments.

An alternative route is described in French patent application No. 2,629,779 dated June 2, 1976 to St. Gobain, which describes the preparation of an anti-lacerating windshield in which a polyvinyl butyral film is bonded between two glass sheets and to this laminate there is added, on an outer glass sheet, a preformed polyurethane layer obtained by reacting:

(a) an aliphatic polyether with free hydroxyl groups and (b) an aliphatic polyisocyanate.

These subsequently applied films have been proved to be really optimum in eliminating formation of lacerating glass fragments, especially as regards flat glass.

Since most motor vehicle windshields are curved, requiring different radii of curvature, including even at right angles, the practical difficulties in laminating such sheets to glass surfaces are very great indeed and it is difficult to manufacture these windshields without optical distortion effects and without tendency to delamination on aging.

U.S. Pat. No. 4,197,333 describes a method for coating the outer surface of a lamp (e.g. a photoflash lamp) with a transparent protective film, whereby a coating, consisting of a high viscosity (3000 to 5000 Centipoise) photopolymerisable composition, is applied by a special dispensing method in which a lamp is rotated under a special dispenser, and the resultant coating is cured by means of ultraviolet light. Methods are not known in the art in which materials of such viscosity can be applied to a motor vehicle windshield as described above.

In addition, the disclosed compositions cannot produce films with the required properties for windshield coatings.

Australian Pat. No. 66.655/74 describes a process for preventing shattering of glass bottles in which a powder with particle size from 1 to 100 micron of a solid component with melting point above 20° C. is dispersed in a normally liquid polyurethane prepolymer and is coated on the outside of the bottle, whereby said coating is then cured by heating.

Tests have clearly shown that such films are entirely lacking both the clarity, adhesion to glass and the necessary scratch resistance as required by a windshield coating.

The special properties of Interpenetrating Polymer Networks (I.P.N.'s) are well known in that the physical properties obtained by the formation of the two polymers "in situ" but without crosslinking between the two types of polymers, are superior to the properties obtained when the two polymers are formed separately and then mixed, or when the conditions are such that definite chemical crosslinks are formed between the two species.

The I.P.N. networks are discussed in detail in the "Application of Group Theory Concepts to Polymer Blends Grafts and I.P.N.'s", Advances in Chemistry Series No. 154, American Chemical Society, Washington D.C. 1976, pages 159-178.

The Applicant has, however, surprisingly shown that the optimum results obtained for a windshield coating designed to lower the formation of lacerating glass fragments are not derived from the true I.P.N. system, but rather from an I.P.N. system so modified by a carefully controlled amount of chemical linkage between the polymer species.

Hence the coating system used in this invention consists, after curing, of an I.P.N. system formed "in situ" by a cross linked acrylic vinyl polymer, a polycaprolactone aliphatic polyisocyanate polyurethane, and a prepolymerised linear polyester-acrylated polyurethane incorporated in a carefully controlled amount.

Said coating is prepared as follows:
(a) polycaprolactone with molecular weight between 800 and 1200 was dissolved in
(b) a mixture of a vinyl monomer N-vinyl-2-pyrrolidone and a branched aliphatic monoacrylate (2-ethyl-hexyl acrylate with at least 10% and no more than 35% of a di- or tri-acrylate monomer);
(c) to this mixture was added: between 5 and 15% of a linear polyester reacted with an aliphatic isocyanate and a hydroxymonoacrylate,
(d) a photoinitiator such as 2-hydroxy-2-methyl-1-phenyl-propan-1-one or a substitute derivative of such product, or a mixture of said products, such that the amount of said photoinitiator is between 1% and 3% of the total composition,
(e) a silicone flow control agent in the amount of 0.1 to 0.2%.
(f) To the above mixture, immediately before its use, a sufficient quantity of an aliphatic polyisocyanate-biuret adduct-hexamethylene di-isocyanate was added so as to react with 95-100% of the hydroxyl groups present in the first part of the composition; said composition being controlled so that the ratio of polyurethane polymers and the polyvinyl-acrylate polymers is in the range of 1.3:1 to 1.0:1.0 in the final coating composition.

Figure 2:
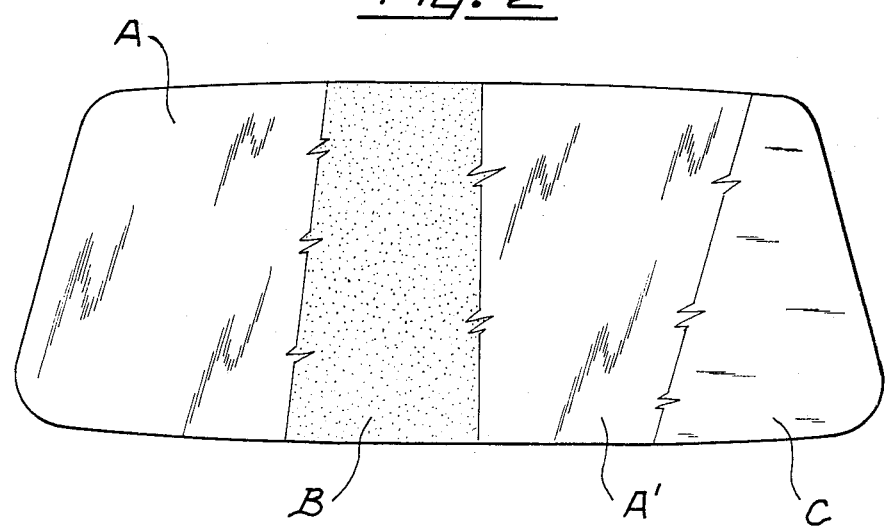
Figure 3:
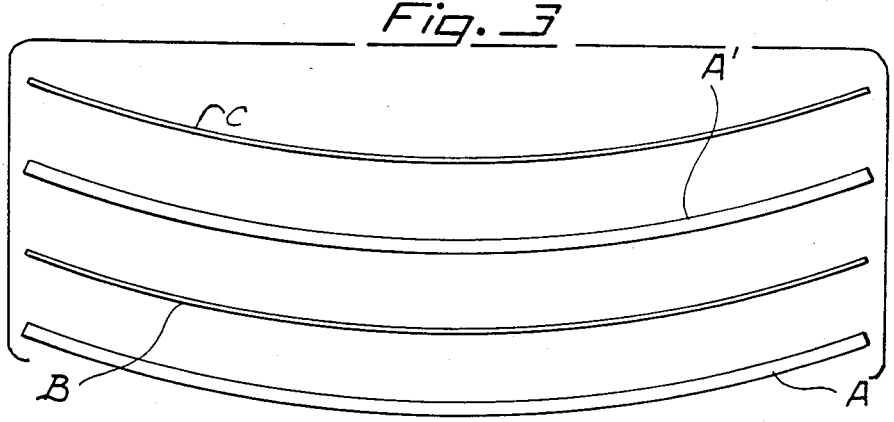

Immediately after preparation, this composition is applied by flow coating or spin coating the inside surface C of a laminated glass windshield consisting of two glass sheets A, A' and an intermediate layer B (see cross sectional view in FIG. 1, front view in FIG. 2 which is delaminated in order to show the component parts, and the exploded drawing in FIG. 3).

At the time of mixing, the composition has a viscosity of about 200 centipoise and the application must be carried out before any marked viscosity change due to the beginning of the reaction between the hydroxyl and isocyanate groups in the composition.

When coating C has been evenly distributed over the surface of glass sheet A' with a wet film thickness of 80 to 150 microns, curing it is then already started as a result of the reaction of the isocyanate with the hydroxyl groups; the film is then submitted to ultraviolet light of high intensity, preferably an emission of a relatively wide spectrum as that produced by mercury in a quartz arc lamp operating at an intensity above 40 watts per centimeter, for a sufficiently long period as to complete polymerization of the acrylic and vinyl monomers, such process taking from 20 seconds to 4 minutes.

This state can be identified by the fact that the film is no longer "tack free" but does not exhibit a very great resistance to scratching. Immediately after exposure to ultraviolet rays, another exposure is made this time to infrared radiation, in order to take to near completion the urethane formation from the caprolactone hydroxys and the isocyanate groups of the polyisocyanates.

Intensity and duration of the infrared treatment must be at a sufficiently low level so as not to cause serious deterioration in the bond between the plastic intermediate layer and the two glass sheets, otherwise serious problems of delamination could occur.

It is essential that the surface of glass sheet A' be clean before applying coating C; this can certainly call for washing with water and detergent, followed by drying at low temperature with a dust-free stream of hot air.

Adhesion between glass sheet A' and coating C can sometimes be improved by a pretreatment of the glass surface with an alcoholic or aqueous alcoholic solution of an organo-silane compound, for example methylacryl-oxypropyl-trimethoxysilane as 2% solution in isopropanol, followed by a gentle drying in warm air; but such pretreatments are not always required.

Test methods for safety glass windshields are set out in the American Safety Council "Standard Code for Safety Glazing Materials for Glazing Motor Vehicles Operating on Land Highways", July 1966, ref. Z 26.1. These tests are generally used in industry.

The coating C, in accordance with the invention, must guarantee both a transparency equal to that of glass, as well as the optical and light stability properties required by the stringent ASA standards prevailing in the U.S.A. and the ECE standards prevailing in the E.E.C. states.

The degree of optical distortion must be measured, for example, in accordance with ASA Standard Z 26.1, paragraph 5.15: the optical properties must be measured, for example, according to ECE Standard R 43; the stability to light properties must be measured, for example, in accordance with ASA standards Z 26.1—1977, paragraph 5.1.

The features of the invention will appear more clearly from the following examples:

EXAMPLE 1

A liquid coating composition was prepared as follows: 35 parts by weight of linear polycaprolactone (molecular weight 1000 and hydroxyl value 112 mg KOH/g) were dissolved in 22.3 parts by weight of N-vinyl-2-pyrrolidone, 7 parts by weight of 2-ethyl-hexylacrylate, 7 parts by weight of pentaerythritol triacrylate and 3 parts by weight of hexanediol diacrylate.

When a clear homogeneous solution was obtained, 8 parts by weight of linear urethane-acrylate polyester were added (2 moles of 1.6 hexanediol reacted under $N_2$ atmosphere at 160°–180° C.) and the resulting polyester was reacted under reflux with 1.2 moles of 2-hydroxy-ethyl acrylate and 2.2 moles of 4.4 methylene bis-(cyclohexyl-isocyanate).

After the addition of 1.5 parts by weight of photoinitiator 2-hydroxy-2-methyl-1-phenyl-propan-1-one and 0.2 parts by weight of silicone flow control agent, the premixture was fully degassed to remove the bubbles either by leaving it to rest for a prolonged period or by applying a moderate vacuum.

This solution can be easily stored for periods over six months provided it be protected from intense light.

Immediately before coating, a laminated glass windshield was cleaned on the inside surface by washing it with a mild aqueous solution of detergent; it was then left to dry in a current hot air.

84 parts by weight of the above coating composition were carefully mixed at a low mixing speed with 16 parts weight biuret adduct hexamethylene-di-isocyanate (26.5% NCO). Viscosity of the coating mixture at ambient temperature of 21° C. was 220 centipoise.

The mixture which was prepared in the above described way fast became free from bubbles and was then applied on the inside surface of the previously cleaned laminated glass windscreen.

The coating was obtained by the spin coating process with the coating deposited on the glass sheet at a certain number of different points on the surface so as to completely cover said surface.

After termination of this operation, average wet film thickness of the coating composition was found to be 90 microns.

The coating was cured by passing the windshield with the coated side on top under a standard mercury/quartz arc lamp with power consumption of 40 watts/cm and equipped with their specific reflectors.

After an exposure of 40 seconds, the film was found to be hard but displayed a slight residual tack on the surface, showing that, although polymerization of the vinyl-acrylate component was complete, formation of the urethane from the polycaprolactone and the isocyanate-biuret adduct was incomplete.

When this same windshield was then passed through a standard infrared oven for a period of 7 minutes, followed by cooling, the internal coating was found to be hard and firmly adherent.

During the infrared drying process, the intensity of radiation was controlled so that the temperature on the glass sheet surface never exceeded 130° C., this being in order to ensure no delamination of the intermediate layer.

After 28 days aging, the resultant windshield (see FIG. 1) was tested for impact behavior and was found to be very efficient in eliminating the free flying glass fragments.

Additional tests showed good resistance to moisture, good resistance to yellowing under ultraviolet rays, a good surface scratch resistance and capacity to allow light damage to disappear with time, as well as good resistance to yellowing and softening at high temperatures, good resistance to fragility at low temperatures and good adhesiveness.

EXAMPLE 2

A windshield was prepared exactly in the same way as in example 1 except that the photoinitiator used for the coating mixture was 1-isopropylphenyl-2-hydroxy-2-methyl propan-1-one; no difference in results of the finished windshield was noticed apart from the curing time under the ultraviolet lamp which could be reduced by some 2:5 seconds.

EXAMPLE 3

A windshield was prepared exactly in the same way as in example 1 using a mixture as in example 1 except for the 8 parts in weight of linear urethane acrylate polyester.

It could be expected that this type of composition would have produced through polymerization on the windshield surface a true I.P.N. of a crosslinked vinyl acrylic polymer and a caprolactone based polyurethane; therefore said composition could offer the best possible physical properties when the coated sheet was submitted to testing as described in the preceding examples. The consequent measurements clearly showed instead poorer results with regard to protective capacity against flying lacerating glass fragments and impact strength of the windshield.

EXAMPLE 4

A windshield was prepared in exactly the same way as in example 1, except that the coating mixture used on the inside surface did not contain di- or tri-acrylate monomers. The ultraviolet ray curing time has to be increased by a factor of three and the resultant film revealed excessive softening at high temperatures.

I claim:

1. Process for manufacturing a safety glass windshield for motor vehicles, said windshield having an appreciably lower formation of glass fragments or needles in the event of impact or fracture of the windshield which consists of:
    (A) coating a laminated glass windshield comprising two glass sheets bonded together with an intermediate plastic sheet on the clean inside surface of said windshield with a liquid composition consisting of the following components:
    (a) a linear polycaprolactone with a molecular weight between about 800 and 1200, and
    (b) an aliphatic polyisocyanate in an amount such as to be able to react with 95–100% of the hydroxyl groups present in the aforesaid polycaprolactone, and
    (c) vinyl and acrylic ester monomers, capable of providing a clear solution of the above mixed ingredients, wherein 10 to 35% of their total weight consists of a di- or tri-acrylate ester, and
    (d) a prepolymer formed from a linear polyester pre-reacted with an hydroxy-acrylate ester and an aliphatic isocyanate, such that the amount of said polymer is between 5 and 15% of the total composition, and
    (e) a photoinitiator, being 2-hydroxy-2-methyl-1-phenyl-propan-1-one in an amount of 1 to 3% of the total composition, and
    (f) with or without additives to control the flow properties of the liquid composition, and
    (B) curing said coated windshield to produce a polymerized film thereon, said film containing urethanes and vinyl-acrylate polymers, and components being employed in such proportions that the ratio of total urethanes to the total vinyl-acrylate polymers in the film is in the range of 1.3:1 to 1.0:1.

2. Process for manufacturing a motor vehicle windshield as claimed in claim 1, wherein said liquid composition is coated on the inside surface of the laminated glass windscreen, and is then cured by ultraviolet and infrared radiation.

3. Process for manufacturing a motor vehicle windshield as claimed in claims 1 or 2 wherein immediately before coating said liquid composition on said windshield, the polyisocyanate is added to the remaining components.

* * * * *